United States Patent [19]

Yamamoto et al.

[11] 3,872,381

[45] Mar. 18, 1975

[54] DIGITAL TRANSMISSION SYSTEM

[75] Inventors: Hajime Yamamoto; Kazuhiro Watanabe, both of Tokyo, Japan

[73] Assignee: Nippon Telephone and Telephone Public Corporation, Tokyo, Japan

[22] Filed: Aug. 24, 1972

[21] Appl. No.: 283,527

[30] Foreign Application Priority Data

Aug. 28, 1971 Japan .............................. 46-66215

[52] U.S. Cl. ........... 325/42, 179/15 BP, 179/15 FS, 325/38 A, 325/49, 325/50, 325/65, 325/329, 325/330, 333/18

[51] Int. Cl. ............................................ H04b 1/12

[58] Field of Search ........... 325/38 R, 38 A, 41, 42, 325/49, 50, 65; 343/205; 178/69 R, 68, 69.5 R; 333/18; 328/165, 155; 179/15 BP, 15 BS, 15 FD, 15 FS, 15 BC

[56] References Cited

UNITED STATES PATENTS

| | | | |
|---|---|---|---|
| 2,719,189 | 9/1955 | Bennett et al. ................ | 179/15 BC |
| 3,761,818 | 9/1973 | Tazaki et al. .................... | 325/38 A |
| 3,775,688 | 11/1973 | Hinoshita et al. .................. | 325/42 |

*Primary Examiner*—Robert L. Griffin
*Assistant Examiner*—Marc E. Bookbinder

[57] ABSTRACT

In the digital transmission system of the type in which from the transmitter are transmitted VSB- or SSB-modulated pulses of the sampling-point-zero-cross type multi-level pulse signal having the clock or pilot signal for timing and the carrier inserted at the ends of the band of said multi-level pulse signal, and at the receiving end said clock signal and said carrier are recovered to demodulate the modulated multi-level pulse signal, the intersymbol interferences at the sampling points spaced by one and two time slots apart from the center sampling point of the single pulse response in the transmission line are detected and used to automatically control the optimum phases of the recovered clock signal and carrier.

5 Claims, 6 Drawing Figures

THE REGION IN WHICH THE CODE ERROR RATE UNDER $10^{-6}$ WHEN THE PHASES OF THE DEMODULATING CARRIER AND OF THE TIMING SIGNAL ARE DEVIATED FROM THE OPTIMUM PHASES.

DIGITAL TRANSMISSION SYSTEM

BACKGROUND OF THE INVENTION

The present invention relates generally to a modulated pulse transmission system and more particularly to a multi-level pulse digital transmission system utilizing the single sideband modulation and the vestigial sideband modulation.

There have been recently used widely FDM lines for the transmission of the analog type voice information, and the demand for the digital transmission lines for various data communications, facsimile and the like has increased. However, it is almost impossible to convert the existing FDM lines into the digital transmission lines with the millimeter and quasi-millimeter wave bands because of the tremendous cost that will be required.

The PCM-FDM transmission system has been proposed in order to use the existing FDM lines for the digital transmission lines. PCM denotes the pulse code modulation and FDM, the use of the existing FDM lines which have been used for the transmission of voice signal. However, the VSB transmission system is used in the PCM-FDM system in order to transmit the multi-level pulse signal with as many levels as possible, as, for example, 8 to 16 levels under the severe or hard frequency band limitation, thereby improving the rate of utilization of transmission lines so that even in an ideal transmission line the eye apertures in the directions of the amplitude and time of the pulse train are reduced. In addition, practical transmission lines have line distortion and deviation in phase of the timing signal and the demodulating carrier. Therefore, the circuit components in digital transmission system must meet the severe ratings, and the variation in transmission line characteristics and aging present serious problems. In case of the VBS modulation system in which the multi-level pulse signal is used, the timing signal and the carrier cannot be recovered from the information signal so that the pilot signals for synchronous extraction are inserted into the ends of the band of the modulated wave. Therefore, the timing signal as well as the demodulating carrier may be recovered in response to these pilot signals. However, the phases of the timing signal and of the carrier tend to be adversely affected by line distortion so that the error rate is increased and the line quality is degraded. The problem of the deviation in phases of the timing signal and the demodulating carrier may be overcome to some extent by an automatic equalizer, but the number of taps of the automatic equalizer must be increased as the phase deviation is increased. Furthermore, when the transmission lines are switched, the automatic equalizer fails very often to function because of the phase deviation caused by the variation in transmission characteristics.

The response of class 4 partial response system has been known as being very strong theoretically to the deviation in phase of the timing signal and the carrier, and the synchronous recovery or reproduction of the timing signal and the demodulating carrier is simple and the check of errors in the coded signals becomes possible. (A class 4 partial response system is disclosed, for example, in "Generalization of Technique For Binary Data Communication", E. R. Kretzmer, LEEE Trans COM-14, No. 1, 1966). However, this system has a distinct defect in that the number of signal levels is about twice as many as compared with the above described multi-level pulse signal transmission system when the same amount of information is transmitted. Compared with the ordinary multi-level pulse transmission system, the error rate of the partial response system is degraded in the order of 3 dB when the same amount of information is transmitted, but when the existing FDM transmission lines are used for digital transmission, the limit to the number of signal levels is dependent upon the noise produced in the devices rather than the S/N ratio of the transmission line, so that the error rate of the former system is worse than the latter system by about 6 dB.

One of the objects of the present invention is therefore to provide a stable and highly efficient digital transmission system utilizing the existing FDM transmission lines.

Another object is to provide a PCM-FDM transmission system utilizing the ordinary multi-level signal which system is not adversely affected by the deviation in phase of the timing signal and the demodulation carrier.

Briefly stated, in accord with one embodiment of the present invention, the intersymbol interferences $a_{\pm 1}$ to the pulses adjacent to the single pulse response waveform and the intersymbol interferences $a_{\pm 2}$ to the pulses spaced apart from said single pulse response waveform by two time slots, respectively, are detected in response to the control of weights of the taps of the automatic equalizer so that the timing phase may be so controlled as to satisfy the relation $a_{+1} - a_{-1} = 0$ whereas the phase of the demodulating carrier may be so controlled as to satisfy the relation $a_{+2} - a_{-2} = 0$.

The above and other objects, features and advantages of the present invention will become more apparent from the following description of one preferred embodiment thereof taken in conjunction with the accompanying drawing.

Figure 1:
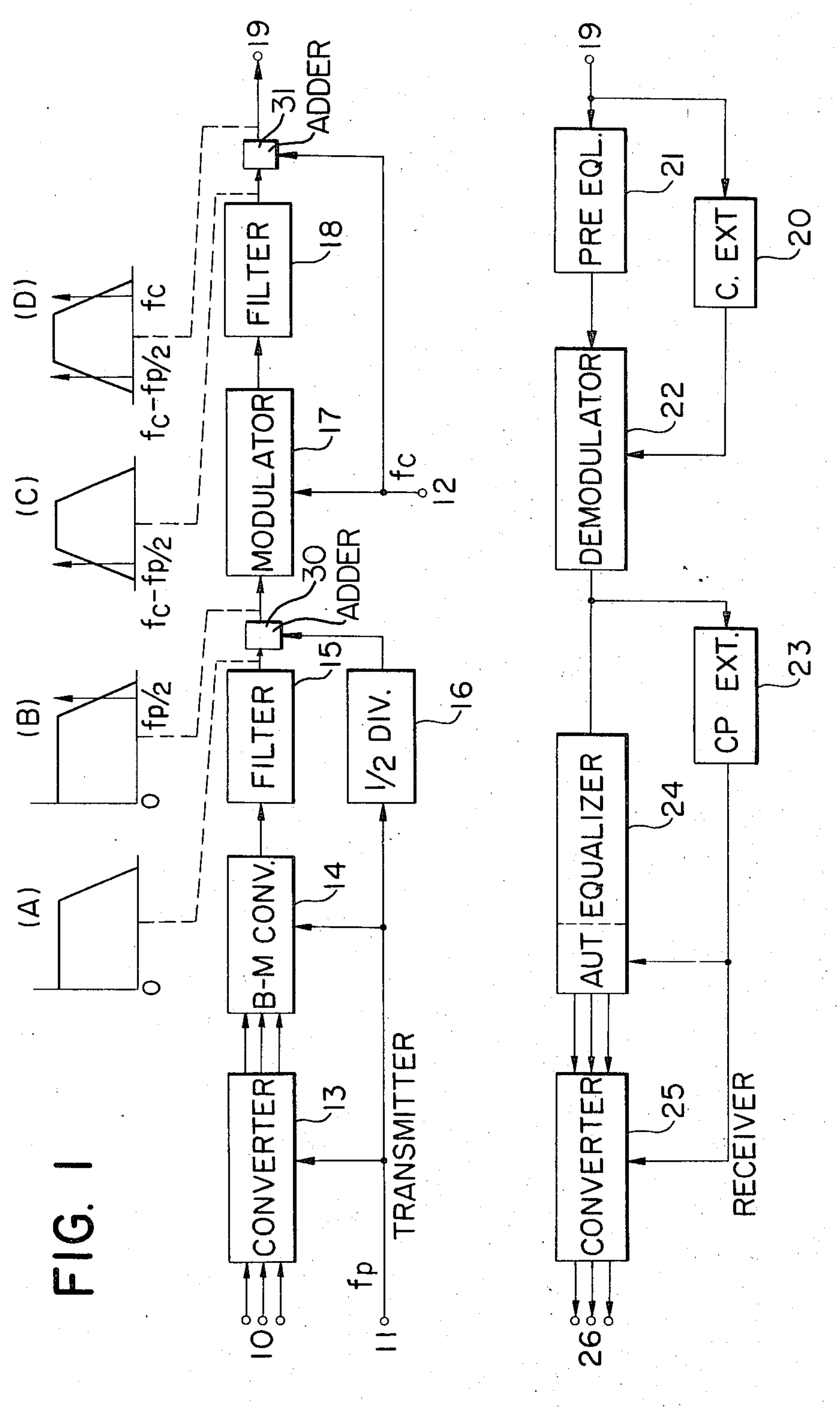
FIG. 1 is a block diagram used for explanation of the PCM-FDM transmission system and more specifically the multi-level pulse digital transmission system utilizing the vestigial sideband modulation system.

DESCRIPTION OF THE PREFERRED EMBODIMENT:

Referring to FIG. 1, information to be transmitted is applied in the form of a binary coded signal to input terminals 10, and is converted by a converter 13 into the desired codewords adapted for transmission. Thereafter, by a binary-to-multi-level signal converter 14, the information is converted into the multi-level signals. The clock signal of a frequency $f_p$ is applied to a terminal 11 and to the converters 13 and 14. The output signals from the converter 14 are fed into a Nyquist shaping and filter circuit 15 and shaped into the sampling-point-zero-cross type single-pulse-response signals (i.e., single pulse response waveform of which the adjacent sampling point level is zero). In this case, the spectral band is limited. The frequency spectrum of the output signal from the filter 15 is denoted by A. The clock pulses of a frequency $f_p$ applied to the terminal 11 are converted into the clock pilot signals of a frequency $f_p/2$ by a frequency divider 16 and added to the output signal of the filter 15 as shown at B by means of an adder 30. The synthesized signal is frequency-modulated by a modulator 17 to which is applied the carrier of a frequency $f_c$, and is converted into the VSB signal by a VSB shaping and filter circuit 18 as shown at C. Thereafter, the carrier applied to a terminal 12 is added as a carrier pilot signal by means of adder 31 to the ends of the band of the output signal from the filter 18 is shown at D. The multi-level pulse signal is transmitted on an existing FDM line 19. If an SSB shaping and filter circuit is used instead of the VSB shaping circuit 18, the output signal of the modulator 17 is connected into an SSB signal.

At the receiving end, the multi-level pulse signal is fed into a carrier-extraction circuit 20 in order to extract the carrier pilot signal. The multi-level pulse signal is also fed into a pre-equalizer 21 so that the distortion of the transmission line may be fixed and equalized and so that the interference signal from the adjacent channel may be removed. The carrier extracted by the carrier extractor 20 is fed into a demodulator 22 which demodulates the output signal of the pre-equalizer 21. The clock pilot signal contained in the demodulated signal is extracted by a clock signal extraction circuit 23, and is fed into an automatic equalizer 24 and a code converter 25. The output signal of the demodulator 22 is equalized into the sampling-point-zero type single-pulse-response waveform, and is sampled in response to the clock signal applied from the circuit 23 so that the multi-level pulse signal may be detected. The output signal from the automatic equalizer 24 is code-converted by a code converter 25 so that the original codes may be transmitted to output terminals 26.

When the clock signal and the carrier signal are inserted as the pilot signals at the ends of the band of information transmitted and are recovered at the receiving end, the phases of the above two sync signals change due to the change in delay time characteristic of the transmission line due to temperature change and aging. Furthermore, the circuits used for extracting these two signals are also affected by the temperature change so that it is impossible to maintain the optimum phase. Therefore, the error rate is increased, and the transmission quality is degraded. In the PCM-FDM system, it is necessary that the two sync signals must be always so controlled as to be in the optimum phase especially in a high efficiency PCM-FDM system in which a large number of multi-level pulse signals are transmitted in the band close to the Nyquist band having almost no excess band.

According to the present invention, the automatic control of the optimum phase of the clock pilot signal as well as the carrier for demodulation may be effected only by inserting the operational amplifiers at the transmitter and voltage-control type phase shifters at the receiving end.

Figure 2:
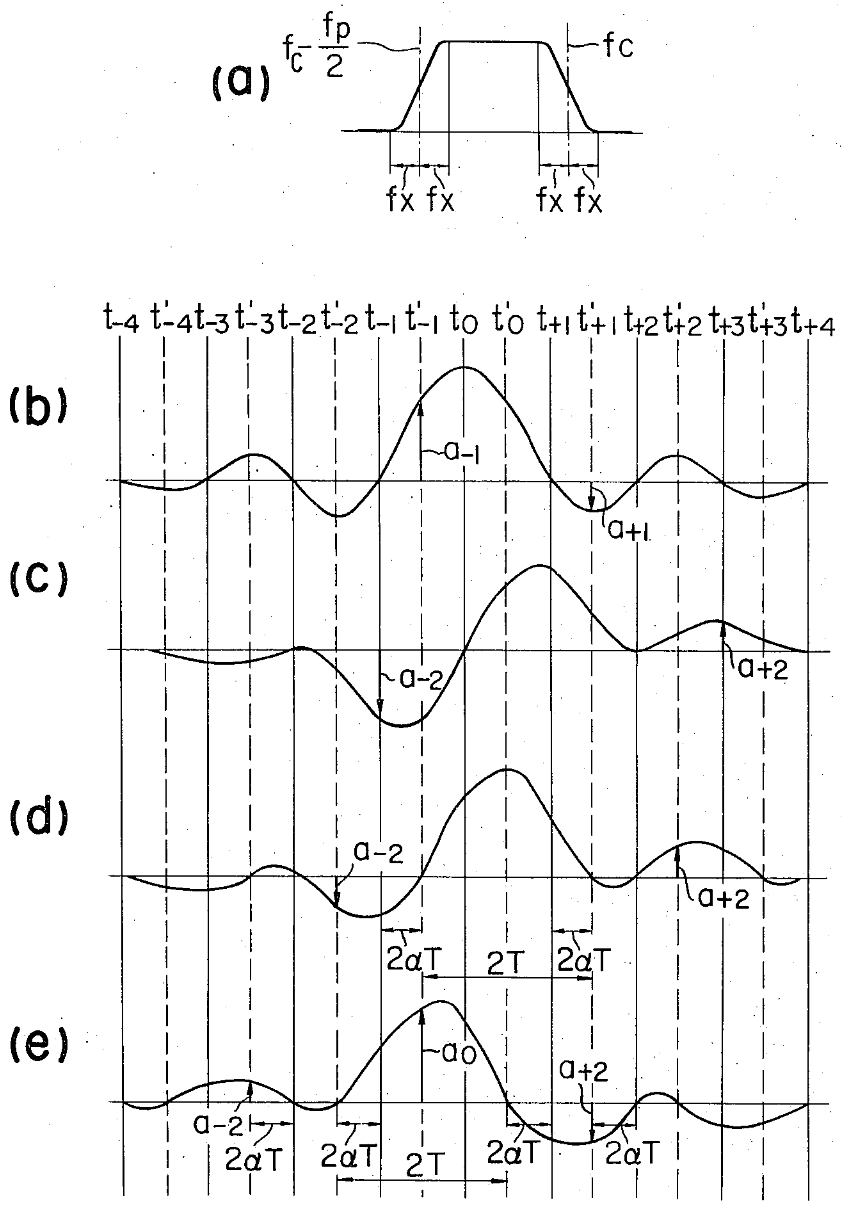
FIG. 2 illustrates the single pulse response waveforms used for explanation of the underlying principle of the present invention.

Next referring to FIG. 2, the underlying principle of the present invention will be described. It is assumed that the VSB shaping characteristics as well as the low-pass filter characteristics have the same cosine-roll-off and that the transmission line has no delay distortion and amplitude distortion. FIG. 2*a* shows the frequency spectrum of the carrier pulse signal. $f_c$ is the carrier frequency whereas $f_p/2$, the clock pilot signal frequency. When demodulated, the single pulse response waveform is given by the formula $$D(t)=\cos\{\pi x[t/T])/\pi t/T\{1-(2xf/\pi T)^2\} \cdot \sin(\pi t/2T)$$

where $t$ = time, $T$ = sampling width, $\alpha$ = deviation by $\alpha\pi$ radians of the carrier from the optimum phase, and $X = 2f_x/f_p$, representing the steepness of the roll-off characteristic.

FIG. 2*b* shows the waveform demodulated by the demodulating carrier with the optimum phase, that is with 60 = 0. FIG. 2*c* shows the waveform demodulated by the carrier advanced by 90° from the optimum phase. In general, the waveform shown in FIG. 2*b* is called the in phase component of the single pulse response waveform whereas the waveform shown in FIG. 2*c*, the orthogonal component. FIG. 2*d* shows the waveform demodulated by the modulating carrier advanced by $\alpha\pi$ radians from the optimum phase, and FIG. 2*e*, the waveform demodulated by the modulating carrier lagging by $\alpha\pi$ radians behind the optimum phase.

In the automatic control of the timing phase in accordance with the present invention, the optimum sampling positions are $t_{\pm n}$ ($n = 0, 1, 2, \ldots$) in case of the waveform shown in FIG. 2*b* when the demodulating carrier is in the optimum phase. If the timing phase is delayed so that the sampling points are deviated to $t'_{\pm n}$ ($n = 0, 1, 2, \ldots$), then the following equation applies:

$$a_{+1} - a_{-1} < 0$$

where $a_{+1}$ and $a_{-1}$ denote the intersymbol interferences at the sampling points $t'_{+1}$ and $t'_{-1}$ on both sides of the center sampling point $t'_0$. In like manner, when the timing phase advances, the following relation is true:

$$a_{+1} - a_{-1} > 0.$$

It will be readily seen from the above relations that in order to attain the optimum timing phase, the timing phase is delayed when $a_{+1} - a_{-1} < 0$and is advanced when $a_{+1} - a_{-1} > 0$ so that the relation $$a_{+1} - a_{-1} = 0$$

may be always true. When the intersymbol interference is small, it may be approximately derived from the tap control of the automatic equalizer so that the timing phase is controlled in such a manner that the difference between the voltages which control the weights of the two taps adjacent to the center tap of the automatic equalizer may become zero.

The essential function of various types of adaptive automatic equalizers is to estimate intersymbol interferences so as to eliminate them. The present invention utilizes only this function so as to adjust the optimum timing phase based upon the above described principle by utilizing the estimated intersymbol interferences $a_{+1}$ and $a_{-1}$. One example will be described with reference to $a_{+1}$. First the polarity of a signal is obtained, and from this signal the correlation between this signal and the polarity of error at one time slot earlier. Thus a quantity in proportion to the intersymbol interference $a_{+1}$ is obtained even when the noise is high and the intersymbol interferences occur. In like manner a quantity in proportion to $a_{-1}$ is obtained from the correlation between the polarity of a signal and the polarity of error at one time slot later.

There are many other methods for estimating intersymbol interferences by utilizing signal levels, magnitudes of errors, and so on instead of polarities of signals. These methods are used in automatic equalizers so that no more detailed explanation will be made in this specification, and reference is made for example to D. Hirsh, W. J. Wolf "Simple Adaptive Equalizer for Efficient Data Transmission", IEEE Trans. Ct. February 1970.

Next, the method for controlling the optimum phase of the demodulating carrier will be described hereinafter. As described hereinbefore, when the phase of the demodulating carrier advances from the optimum phase, the demodulated waveform as shown in FIG. 2*d* is obtained. When the timing phase control described hereinbefore is made for this demodulated waveform, the sampling points rest at $t'_{\pm n}$ and the intersymbol interferences with respect to the adjacent sampling points become almost zero. In this case, the intersymbol interferences $a_{+2}$ and $a_{-2}$ at the sampling points $t'_{+2}$ and $t'_{-2}$ spaced from the center sampling point $t'_0$ by two time slots have the following relation:

$$a_{+2} - a_{-2} > 0.$$

When the demodulating carrier lags behind the optimum phase as shown in FIG. 2*e*, the following relation is held:

$$a_{+2} - a_{-2} < 0.$$

When the demodulating carrier is in the optimum phase as shown in FIG. 2*b*, $$a_{+2} - a_{-2} = 0.$$

From the foregoing relations, it will be seen that the carrier may lag when $a_{+2} - a_{-2} < 0$ whereas the carrier is advanced when $a_{+2} - a_{-2} > 0$ so that the carrier may be controlled to be in the optimum phase. The same is true when the distortion of the transmission line exists.

When the phase of the demodulating carrier deviates considerably from the optimum phase, the waveform becomes as shown in FIG. 2*c*. In this case, the intersymbol interference $a_{-2}$ becomes a large negative value. In general, the relation between the intersymbol interferences $a_{+2}$ and $a_{-2}$ are shown in FIG. 2*c*, and the intersymbol interference $a_{+2}$ is small so that if the carrier is so controlled as to minimize the intersymbol interference $a_{-2}$, the carrier may be in the optimum phase and be free from the influence of the orthogonal component. Even when the phase of the carrier deviates in the opposite direction, it may be controlled to be in the optimum phase by making the intersymbol interference $a_{+2}$ equal to $a_{-2}$.

As in the case of the timing phase control, the tap control of the automatic equalizer may be used to make $$a_{+2} - a_{-2} = 0.$$

Figure 3A:
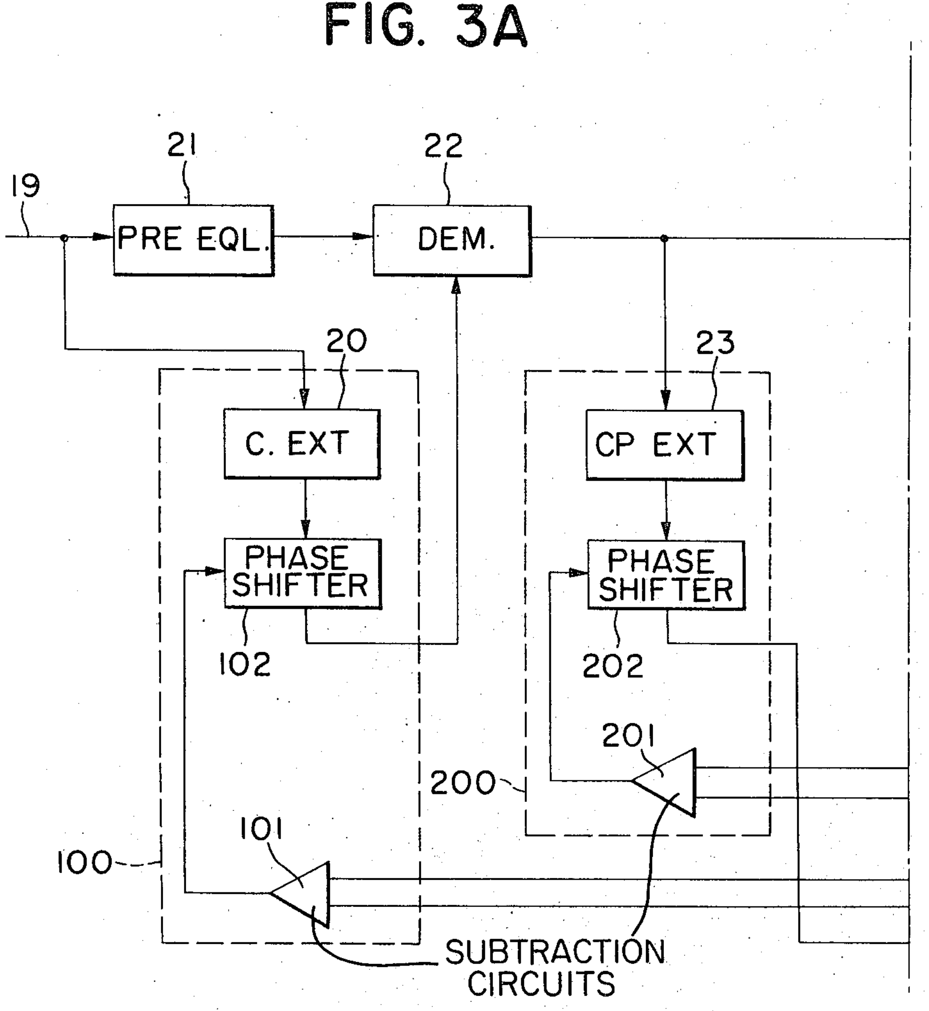
FIG. 3 is a block diagram of one preferred embodiment of the present invention in which the automatic phase control system for controlling the phases of the timing signal and the demodulating carrier in accordance with the present invention is applied to the transmission system shown in FIG. 1.
Figure 3B:
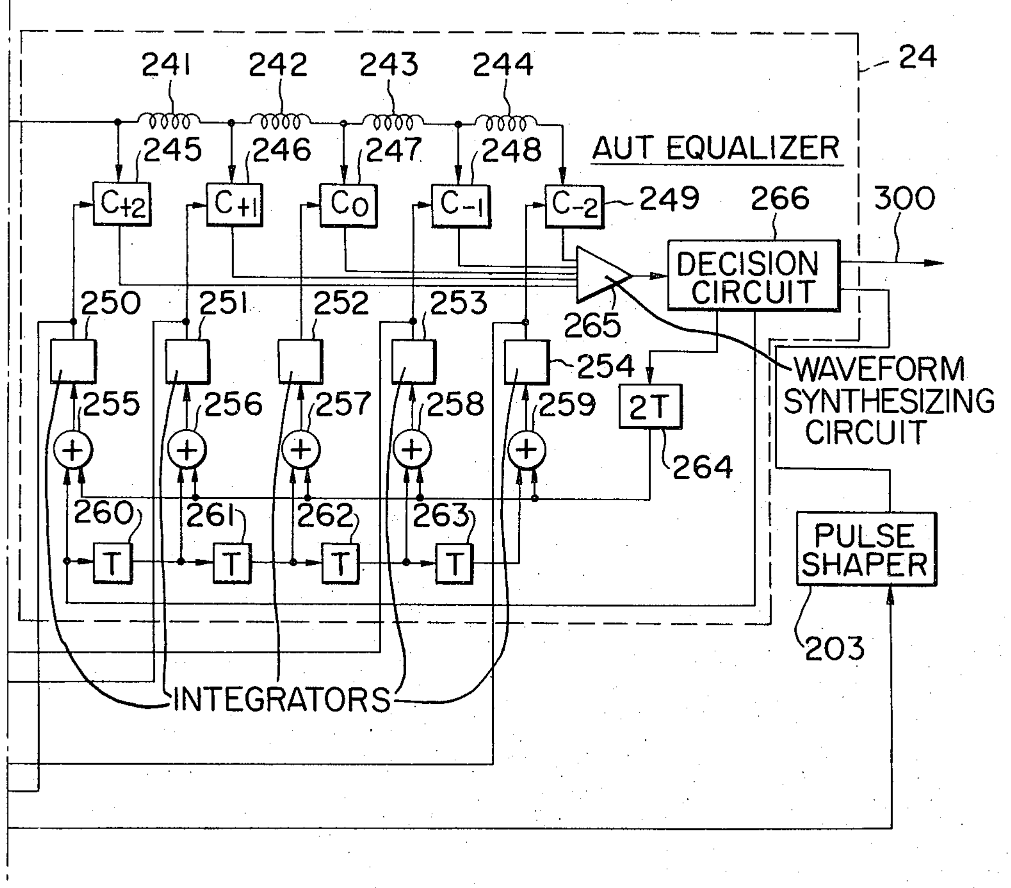
Figure 3:
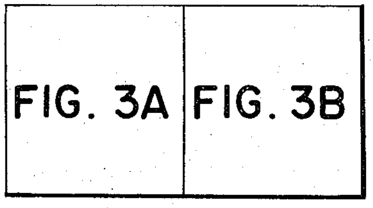

So far the timing phase control is effected first and then the phase control of the demodulating carrier is made. In practice, the controls of both the timing phase and the phase of the demodulating carrier are made simultaneously. As with the case of timing phase control, $a_{+2}$ and $a_{-1}$ are estimated by an intersymbol interference estimating method which is used in an adaptive automatic equalizer. This will be described with reference to FIG. 3 illustrating the automatic control system for controlling the timing signal and the demodulating carrier in accordance with the present invention applied to the PCM-FDM system shown in FIG. 1. The block diagram shown in FIG. 3 is substantially similar to that shown in FIG. 1 except that the automatic demodulating carrier control unit 100, and the automatic timing phase control unit 200 are inserted and the automatic equalizer is illustrated in more detail. The multilevel pulse signal including the carrier pilot is transmitted on the line 19 and is applied to the carrier extraction circuit 20 and the pre-equalizer 21. In the carrier extraction circuit 20, the carrier pilot signal is extracted, and the output of the pre-equalizer 21 is fed into the demodulator 22 so that the demodulated waveform is derived. The demodulated output is fed into the automatic equalizer 24 and to the clock signal reproducing circuit 23 so that the clock pilot signal may be extracted. In the automatic equalizer 24, the demodulated output is formed into the sample-point-zero-cross type single pulse response waveform, and transmitted on a line 300 after the multilevel pulse signal decision. The multi-level pulse signal is converted into the original codes by a code conversion circuit (not shown). The above described process is substantially similar to that of the system shown in FIG. 1.

For the sake of simplicity, the automaatic equalizer 24 is shown as having five taps. Reference numerals 241, 242, 243 and 244 are analog delay lines with a pulse delay time T. The variable weight $c_0$ of the center tap is adjusted by the waveform synthesis adjusting circuit 247, and the intersymbol interferences of the output waveforms may be compensated by the synthesis of the output waveforms of the waveform synthesis adjusting circuits 245, 246, 248 and 249. Therefore, in case of the single pulse response waveform, the intersymbol interferences at the two sampling points adjacent the center sampling point and at the two sampling points adjacent the center sampling point and at the two sampling points spaced apart from the two adjacent sampling points by one pulse become zero. Reference numerals 250–254 denote integrators; 255–259, modulo-2 adder circuits; 260–263, one-bit shift registers; 264, a two-bit shift register; 265, a waveform synthesizing circuit such as an analog addition circuit; and 266, a multi-level pulse signal decision circuit, for example an encoder for transforming the analog signal output of the synthesizing circuit 265 into binary signals.

Next the adjustment of the weights of the taps of the waveform synthesis adjusting circuit 246 will be described. It is assumed that the intersymbol interferences at the succeeding sampling points are positive in the single pulse response. In a random pulse train, the intersymbol interferences by one positive pulse to the succeeding pulses are positive, and when the signs (positive or negative) and the levels of other pulses may be selected randomly, the probability of the next pulse being in the positive error with respect to the normal level is greater than one-half. In like manner, the probability of the negative error at the next pulse sampling point is greater than one-half when the marked pulse is negative. That is, the correlation of the polarity of a pulse and the error of the succeeding pulse is positive. In this case, when the polarity is positive, it is denoted by 1 whereas when the polarity is negative, it is denoted by −1. In the single pulse response waveform, when the interference to the succeeding pulse is negative, the above correlation is negative. The modulo-2 adder 256 accomplishes the multiplication of the polarity of the signal and the error polarity. The output is +1 when the result of the mod 2 addition is 1 whereas the output is −1 when the result is 0. The output of the adder 256 is integrated by the integrator 251. In case of the positive intersymbol interferences, the output of the integrator 251 is increased in the positive direction. In response to the output of the integrator, the circuit 246 is controlled. When the intersymbol interference becomes negative, the integrated level is decreased. When the output of the integrator 251 reaches a predetermined level, the interference becomes zero. In this case, the intersymbol interference is a monotone function of the integrator 251. That is, when the outputs of the integrator are equal, the intersymbol interferences of the single pulse response before equalization are same.

The automatic equalizer of the type described has been already devised and demonstrated so that no further description will be made in this specification. For example, reference is made to R. W. Lucky "Technique for Adaptive Equalization of Digital Communication Systems", B.S.T.J. Vol. 45, pp. 255–286, February 1966.

The automatic demodulating carrier control unit 100 comprises the carrier extraction circuit 20, an arithmetic circuit 101 and a voltage-controlled phase shifter 102. The automatic timing phase control unit 200 comprises the timing extraction circuit 23, a subtraction circuit 23, a subtraction circuit 201 and a voltage-controlled phase shifter 202.

The outputs of the integrators 250 and 254 in the automatic equalizer 24 are fed into the subtraction circuit 101 to detect the difference between the two outputs. That is, the outputs of the two integrators 250 and 254 represent the intersymbol interferences $a_{+2}$ and $a_{-2}$ at the sampling points spaced apart from the center sampling point by two time slots (See FIG. 2) so that the output of the subtraction circuit 101 represents $(a_{+2} - a_{-2})$. In response to the output from the subtraction circuit 101, the voltage-controlled phase shift circuit 102 is controlled so as to control the phase of the carrier derived from the carrier extraction circuit 20. That is, the phase of the carrier is so controlled that the output, that is $(a_{+2} - a_{-2})$ of the subtraction circuit 101 may become zero. Thus the carrier applied through the phase shift circuit 102 to the demodulator 22 is in the optimum phase.

In like manner, the outputs which represent the intersymbol interferences $a_{+1}$ and $a_{-1}$ at the sampling points adjacent to the center of the pulse, are fed into the subtraction circuit 201 so that in response to the output of the latter, the phase shift circuit 202 is so controlled as to make the output of the subtraction circuit 201 zero. Thus, the clock signal applied from the timing extraction circuit 23 through the phase shift circuit 202 and a pulse shaping circuit 203 to the decision circuit 266 is in the optimum phase. In practice, the time constant used in the automatic carrier control is made longer than that used in the timing phase control so that when the optimum phase of the clock signal is controlled, the phase of the carrier may be also controlled to be in the optimum phase.

Figure 4:
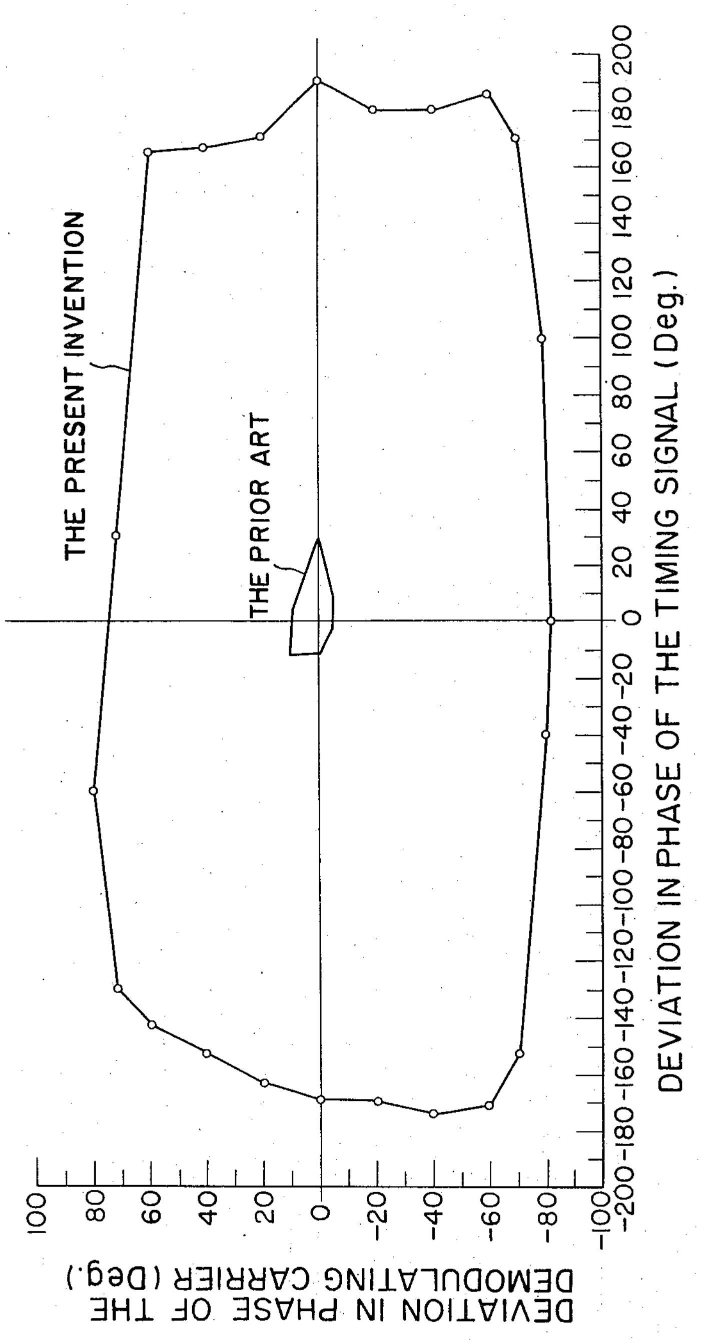
FIG. 4 is a graph illustrating the results of the experiments of the automatic phase control system in accordance with the present invention.

The results of the experiments conducted by the inventors are shown in FIG. 4. The experiments were conducted under the conditions that the excess band for the VSB and Nyquist shapings was 20% of Nyquist Band width; the number of signal levels was eight; and the distortion of the transmission line is such that the eyes for four levels are narrowly opened by the control of the optimum phase control of the carrier made prior to the automatic equalization. FIG. 4 shows the region in which the code error rate is under $10^{-6}$ when the phases of the demodulating carrier and of the timing signal are deviated from the optimum phases under use of the ordinary automatic equalizer. From FIG. 4, the advantages of the present invention are clearly seen. The area of this region is determined by the variable ranges of the voltage controlled phase shift circuits and the loop gainss of the control systems so that the range shown in FIG. 4 may be increased as needs demand.

In the embodiment described hereinbefore, the automatic equalizer is used in controlling the phases of the carrier and the clock signal inserted into the transmitted signal, but it will be understood that even when the automatic equalizer is not used, the correlation between the polarity of the signal and that of the error described hereinbefore may be obtained so that the phases of the timing pulse and of the carrier may be optimumly controlled. Furthermore, it is also possible to automatically control the phases in response to the intersymbol interferences derived from the single isolated testing pulses.

In the above embodiment, when the phase of the carrier is deviated by an angle almost equal to 180°, the phase tends to rest at the point out of phase by 180° from the optimum phase. To overcome this problem, for example a differential code system may be employed so that the information may be correctly reproduced on the receiving end even when the phase is out of phase by 180°.

What is claimed is:

1. In a carrier pulse sideband transmission system of the type including means providing an input multilevel signal, a clock pilot signal and a carrier signal, the improvement comprising means for shaping said input multilevel signals to single pulse response waveforms having zero levels at determined instants before and after the maximum level;

means for adding said clock pilot signal to said single pulse response waveforms;

means for sideband modulating said carrier signal with said single pulse response waveforms having said clock pilot signal inserted therein;

means for adding said carrier signal to said modulated carrier signal;

means for transmitting the sum of said carrier and modulated carrier signals;

means for receiving said transmitted signal;

means for separating said carrier signal from said received signal;

means for demodulating said received signal with said separated carrier signals to produce received signal waveforms corresponding to said single pulse response waveforms;

means for separating said clock pilot signal from said demodulated signal;

means for detecting intersymbol interference comprising means for sampling the demodulated signal less said separated pilot signal at a first point and at second points adjacent said first point and corresponding to equally spaced apart instants of said single pulse response waveforms;

means for controlling the phase of said separated clock pilot signals in response to said detected intersymbol interferences to eliminate intersymbol interferences; and means responsive to said controlled phase clock pilot signals for converting the interference-free demodulated signal less said pilot signal to provide multilevel pulse signals.

2. The carrier pulse transmission system of claim 1 wherein said means for detecting intersymbol interferences comprises means for detecting voltage representative of the amount of intersymbol interferences at a first pair of second points on opposite sides of said first point, and wherein said means for controlling the phase of said separated clock pilot signal comprises means for controlling said phase whereby the difference between the intersymbol interferences detected at a second pair of second points also on opposite sides of said first point approaches zero, said first pair of second points corresponding to instants of said single response pulse waveforms separated from the first point by twice the duration of the separation between said first point and said second pair of second points.

3. The carrier pulse transmission system of claim 1 wherein said means for sideband modulating comprises means for vestigial sideband modulating said carrier signal.

4. The carrier pulse transmission system of claim 1 wherein said means for sideband modulating said carrier signal comprises means for single sideband modulating said carrier signal.

5. In a method for digital pulse transmission of the type including transmission of a vestigial sideband or single sideband multi-level pulse modulated signal in which the level is zero at determined instants before and after the maximum level and having a clock signal and a carrier inserted at the opposite ends of the band of the modulated signal, receiving the transmitted signal and extracting the carrier from the received signal, demodulating the received signal by the carrier, extracting the clock signal from the demodulated signal, and converting the demodulated signal to a multi-level pulse signal with the extracted clock signal, the improvement comprising the steps of detecting voltages representative of the amount of intersymbol interferences at two first points adjacent a center point of the waveform of the demodulated signal less said clock signal, said first points and center point corresponding to the instants of zero level and maximum level respectively of the multi-level pulse signal and controlling the phase of said extracted clock signal to reduce the difference between the voltages representative of intersymbol interferences detected at said two first points to zero.

* * * * *